United States Patent
Carter et al.

(10) Patent No.: US 6,873,758 B1
(45) Date of Patent: Mar. 29, 2005

(54) OPTICAL ADD-DROP FILTER

(75) Inventors: Andrew Carter, Blisworth Northants (GB); Rosemary Cush, Northampton (GB)

(73) Assignee: Marconi LCK Intellectual Property, Ltd., Coventry (GB)

( * ) Notice: Subject to any disclaimer, the term of this patent is extended or adjusted under 35 U.S.C. 154(b) by 56 days.

(21) Appl. No.: 10/111,653

(22) PCT Filed: Oct. 27, 2000

(86) PCT No.: PCT/GB00/04159

§ 371 (c)(1),
(2), (4) Date: Sep. 18, 2002

(87) PCT Pub. No.: WO01/31826

PCT Pub. Date: May 3, 2001

(30) Foreign Application Priority Data

Oct. 28, 1999 (GB) ............................................. 9925402

(51) Int. Cl.[7] .............................................. G02B 6/28
(52) U.S. Cl. ......................................... 385/24; 385/15
(58) Field of Search ............................... 385/24–32, 15

(56) References Cited

U.S. PATENT DOCUMENTS

| | | | |
|---|---|---|---|
| 5,504,609 A | * 4/1996 | Alexander et al. | ............ 398/91 |
| 5,712,932 A | 1/1998 | Alexander et al. | |
| 5,760,934 A | * 6/1998 | Sutter et al. | .................. 398/59 |
| 5,793,908 A | 8/1998 | Mizuochi et al. | |
| 6,002,503 A | * 12/1999 | Mizrahi | ....................... 398/85 |
| 6,069,719 A | * 5/2000 | Mizrahi | ....................... 385/24 |

FOREIGN PATENT DOCUMENTS

| | | |
|---|---|---|
| EP | 0 440 278 A2 | 8/1991 |
| EP | 0 814 629 A2 | 12/1997 |
| EP | 0 869 634 A2 | 10/1998 |
| JP | 10013357 A | 1/1999 |
| WO | WO 98/49795 | 11/1998 |
| WO | WO 99/07097 | 2/1999 |

* cited by examiner

*Primary Examiner*—Phan T. H. Palmer
*Assistant Examiner*—Jennifer Doan
(74) *Attorney, Agent, or Firm*—Kirschstein, et al.

(57) ABSTRACT

An optical add-drop filter for use in a communication system which is capable of communicating both supervisory traffic and communication traffic. Communication traffic is modulated onto first radiation occupying a first range of radiation wavelengths, and supervisory traffic is modulated onto second radiation occupying a second range of radiation wavelengths. When the first and second radiation is received at one or more of the nodes, it is then filtered in the add-drop filters associated therewith to isolate add channels, drop channels, a supervisory channel drop and a supervisory add from primary relatively-low attenuation paths of the filters. The add channels, the drop channels, and the supervisory channel drop and add are then isolated at secondary paths associated with, but not included in the primary paths.

16 Claims, 8 Drawing Sheets

OPTICAL ADD-DROP FILTER

The present invention relates to an optical add-drop filter for use in optical communication systems. Moreover, the invention also relates to an optical communication system including at least one such add-drop filter.

Optical radiation in the context of the present invention is defined as electromagnetic radiation having a free-space wavelength substantially in a range of 20 $\mu$m to 100 nm.

Conventional optical communication systems are operable to convey communication traffic therein. The systems employ one or more techniques to modulate the traffic onto optical radiation which propagates within the systems. The techniques include time division multiplexing (TDM) and wavelength division multiplexing (WDM). In WDM, the traffic is conveyed in one or more radiation channels, each channel being allocated an associated range of radiation wavelengths over which it can convey its traffic.

In an example conventional optical communication system, there is included a transmitter unit linked through an optical fibre waveguide path to a receiver unit. The transmitter unit incorporates a number of optical input ports for receiving communication traffic. Radiation received at the input ports is multiplexed into corresponding WDM radiation channels to provide composite optical radiation which propagates along the path to the receiver unit. At the receiver unit, the composite radiation is demultiplexed to provide radiation corresponding to each of the radiation channels at optical output ports of the receiver unit, the output ports corresponding to the input ports of the transmitter unit.

In such a conventional communication system, it is present practice to insert add-drop filters into the path at locations therealong, these locations being also known as stations. Each filter includes a filter input port, a through port, a drop port and an add port. Moreover, each filter is operable to transmit input optical radiation received at the filter input port to provide corresponding output radiation at the through port and to extract from the input radiation components thereof lying within a preferred range of wavelengths specific for each filter and output them at the drop port. Furthermore, each filter is operative to add radiation present at the add port within the preferred range of wavelengths to the output radiation output at the through port.

Each filter is thereby capable of providing access to one or more specific channels of the composite radiation propagating along the path, for example for regeneration or monitoring purposes.

As a consequence of the add-drop filters being passive devices, there is an insertion loss in the order of 0.5 dB associated therewith which results in attenuation of radiation transmitted from the filter input port to the through port. This insertion loss limits the number of add-drop filters that can be practically inserted in series into the conventional system between the transmitter unit and the receiver unit unless optical amplification is employed along the path. When optical amplification is not employed, if an excessive number of filters are inserted, radiation received at the receiver unit becomes so attenuated that signal-to-noise limitations of the receiver unit prevent reliable reception of radiation propagating from the transmitter unit to the receiver unit via the filters.

When add-drop filters are employed in the system, it is desirable that a mechanism is provided whereby supervisory control information is conveyed to the add-drop filters. Supervisory control information is usable for diagnosing faults or for managing operation of the filters, for example for controlling when information bearing radiation is applied at the add port of one of the filters. This mechanism can be achieved in a conventional manner by adding yet more add-drop filters and arranging the filters in pairs at the stations. A first filter of each pair is concerned with extracting the supervisory control information and a second filter of each pair is involved with extracting a specific channel from the optical radiation under direction of the control information.

Thus, in the conventional system, providing supervisory information for the stations results in additional attenuation occurring from the transmitter unit to the receiver unit. Such additional attenuation limits the number of stations which can be inserted between the transmitter unit and the receiver unit, unless optical amplification is applied along the path. Optical amplification can be expensive. Moreover, optical amplification implemented using erbium doped fibre amplifiers (EDFAs) requires careful control of the magnitude of radiation input to the amplifiers because of inherently non-linear transfer characteristics exhibited by such amplifiers. The aforementioned limit to the number of stations, especially when optical amplification is not employed, is a problem which the present invention is capable of addressing.

The provision of supervisory channels is known in the prior art. For example, in a European patent application EP 0 814 629 A2, there is described an optical fibre cross connect with active routing for wavelength multiplexing and demultiplexing. The cross connect comprises an optical input port, an optical drop port, an optical output port and an optical add port. The input port is connected in sequence through a first coupler A and then through a series of grating filters and phase modulators and next through a second coupler B and finally through a series of two optical taps 1*, 2* before reaching the output port. In a similar manner, the add port is connected in sequence through the second coupler B and then through a series of grating filters and phase modulators and next through the first coupler A and finally through a series of two optical taps 1, 2 before reaching the drop port. Inclusion of the first and second couplers as well as the two taps 1*, 2* between the input and output ports results in the fibre cross connecting incurring a considerable insertion loss; this insertion loss represents a problem in the prior art.

As a further example of known prior art, there is described in a U.S. Pat. No. 5,712,932 a reconfigurable WDM optical routing system comprising a first path region, a second path region and a cross-connect region. The first region comprises a plurality of modulated laser sources for communication traffic and a modulated laser source for conveying supervisory channel information, a first multiplexer for combining radiation output from the sources to generate first WDM composite radiation, a wavelength division multiplexer for extracting from the first WDM radiation the supervisory source radiation and transmitting the communication traffic source radiation and finally a first circulator for receiving radiation transmitted through the first multiplexer and directing it to a first forward transmission path and a cross-connect path. Likewise, the second region comprises a plurality of modulated laser sources for communication traffic and a modulated laser source for conveying supervisory channel information, a second multiplexer for combining radiation output from the sources to generate second WDM composite radiation, and finally a second circulator for receiving the second composite radiation and directing it to a second forward transmission path and the cross-connect path. The cross-connect region comprises a series of switchable Bragg grating filters connecting the first and second circulators together, and also a modem, a mode control processor and a switch controller connected to the wavelength division multiplexer for receiving the supervisory channel radiation, interpreting it and selectively operating the series of Bragg filters in accordance with instructions included within the supervisory channel of the first composite radiation. The routing system suffers a problem that the wavelength division multiplexer and the first circulator appear in series between the first multiplexer and the first forward path resulting in considerable insertion loss between the first multiplexer and the first forward path. This considerable insertion loss represents a problem in the prior art.

In order to address the aforementioned problems, the inventors have devised an optical add-drop filter which is capable of providing a lower insertion loss compared to prior art whilst also providing supervisory channel facilities.

Thus, according to a first aspect of the present invention, there is provided an add-drop filter for filtering information bearing radiation, the filter comprising:
(a) a main input for receiving input information bearing radiation at the filter,
(b) a main output for outputting output information bearing radiation from the filter, and
(c) one or more subsidiary inputs and outputs, characterised in that the main input is coupled through primary filtering means to the main output, and the primary filtering means is coupled through secondary filtering means to the one or more subsidiary inputs and outputs, the primary filtering means for one or more of:
(a) extracting one or more preferred channel radiation components from the input information bearing radiation and coupling said preferred components to the secondary filtering means; and
(b) receiving from the secondary filtering means combined radiation comprising one or more substitute channel radiation components corresponding to said one or more preferred radiation components and outputting the combined radiation together with input information bearing radiation transmitted through the primary filtering means from the main input at the main output, and
the secondary filtering means for one or more of:
(a) isolating from radiation coupled to the secondary filtering means from the primary filtering means individual preferred radiation components and coupling them to corresponding subsidiary outputs; and
(b) combining substitute radiation components received at the secondary filtering means to generate the combined radiation.

The filter provides the advantage that it is capable of extracting and adding both the preferred radiation components and the substitute radiation components as well as providing a relatively low insertion loss from the main input to the main output compared to prior art.

Preferably, in a first embodiment of the invention, the primary filtering means comprises an interferometric structure comprising Bragg gratings for extracting the one or more preferred channel radiation components from the input radiation and coupling said preferred components to the secondary filtering means. Bragg gratings, for example optical fibre waveguide Bragg gratings, provide a convenient structure for isolating preferred radiation components and blocking their direct propagation from the main input through the primary filtering means to the main output.

Preferably, in a second embodiment of the present invention, the primary filtering means comprises a multilayer optical etillon interference structure for extracting the one or more preferred channel radiation components from the input radiation and coupling said preferred components to the secondary filtering means. Such an etillon interference structure is capable, on account of its multilayer construction, of providing highly selective radiation filtration and radiation blocking characteristics whilst being economical to manufacture.

Conveniently, for making provision for supervisory traffic for supervising operation of communication systems incorporating the filter, one of the subsidiary outputs corresponds to a supervisory channel drop output and at least one of the one or more preferred channel radiation components corresponds to a supervisory channel radiation component for output at said channel drop output. Likewise, one of the subsidiary inputs preferably corresponds to a supervisory channel add input and at least one of the one or more substitute radiation components correspond to a supervisory channel radiation component.

On account of the filter being used extensively in communication systems, it is desirable that the secondary filtering means includes a fused fibre coupler for isolating from radiation provided from the primary filtering means one or more of the preferred channel radiation components. Use of the fused fibre coupler assists to make the filter economical to manufacture. Likewise, it is also preferable that the secondary filtering means includes a fused fibre coupler for combining radiation of the one or more substitute radiation components to provide the combined radiation for coupling to the primary filtering means.

In communication systems, optical amplification is often expensive and complex to implement. It is therefore desirable that the filter provides a relatively low insertion loss. Thus, preferably, the primary filtering means provides an optical attenuation therethrough from the main input to the main output of less than 1 dB for radiation wavelengths corresponding to communication channels present in the input radiation.

In communication systems, it is desirable to allocate relatively different wavelength ranges for supervisory traffic compared to wavelength ranges allocated for client payload bearing radiation. Thus, preferably, the filter is operable to isolate and add supervisory channel radiation components in a first wavelength range including a free-space wavelength of 1300 nm and one or more communication channel radiation components in a second wavelength range including a free-space wavelength of substantially 1550 nm.

In a second aspect of the present invention, there is provided a communication system incorporating a plurality of nodes, one or more of the nodes including at least one filter according to the first aspect of the present invention, for adding and dropping radiation components thereat from information bearing radiation propagating within the system between the nodes.

Preferably, at least one of the nodes is operable to regenerate by amplification at least one radiation component corresponding to one or more of supervisory traffic and communication traffic. Such amplification assists to preserve signal-to-noise ratio of the system, especially when the system includes a large number of nodes, for example 100 nodes.

When the supervisory traffic is conveyed by radiation components whose wavelength is substantially dissimilar to communication traffic radiation component wavelength, it is preferable that a first amplifier is used for amplifying components of radiation corresponding to supervisory traffic and a second amplifier is used for amplifying radiation components corresponding to communication traffic.

Preferably, the nodes are arranged in a metro-ring configuration, each node filter operable to couple ring communication traffic radiation through its primary filtering means from its main input to the its main output. Such metro-ring configurations, especially when optical amplification is not employed therein, require low insertion loss filters in order to preserve optical signal-to-noise ratio within the metro-rings.

Conveniently, one or more of the nodes in the system incorporate computing means for interpreting supervisory traffic received at the one or more nodes and for controlling nodal response thereto. Moreover, the computing means of the one or more nodes in the system is preferably operable to be normally in a listening state receptive to supervisory traffic and switchable to a responsive state in response to receiving supervisory traffic from another node addressed by the computing means.

In a third aspect of the present invention, there is provided a method of extracting supervisory traffic and preferred communication traffic from information bearing radiation propagating within a communication system, the system including at least one add-drop filter, the method including the steps of:

(a) receiving the information bearing radiation at the at least one filter;
(b) passing the information bearing radiation to primary filtering means of the at least one filter for extracting filtered radiation from the information bearing radiation corresponding to the preferred communication traffic and the supervisory traffic, and outputting the information bearing radiation after extraction therefrom of the filtered radiation back to the communication system; and
(c) receiving the filtered radiation at secondary filtering means of the at least one filter for isolating the preferred communication traffic from the supervisory traffic and outputting these to respective subsidiary outputs.

Embodiments of the invention will now be described, by way of example only, with reference to the following diagrams in which.

Figure 1:
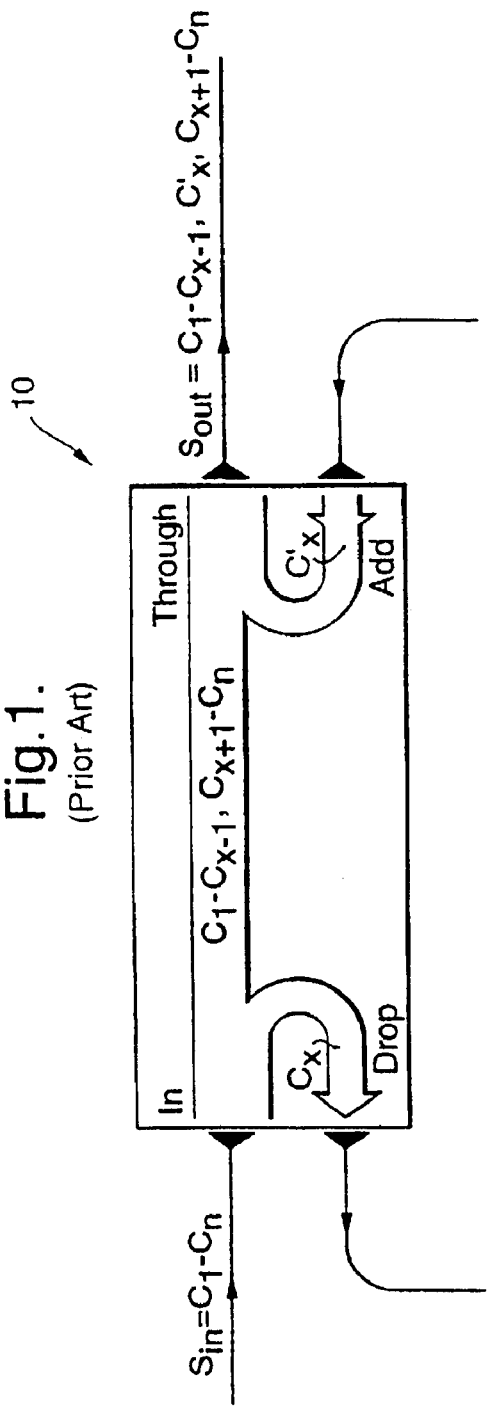
FIG. 1 is an illustration of a conventional passive add-drop filter indicating its function.

Referring to FIG. 1, there is shown a conventional passive add-drop filter indicated by 10. The filter 10 comprises an input port (IN), a through port (TROUGH), a drop port (DROP) and an add port (ADD); all the ports are adapted to interface to optical fibre waveguides. The input port is operable to receive input radiation $S_{in}$ and the through port is operable to provide output radiation $S_{out}$.

The filter 10 is designed to operate over a range of wavelengths which accommodates the radiation $S_{in}$. The radiation $S_{in}$ is a summation of radiation components associated with a sequence of channels $C_i$ where an index i is an integer in a range of 1 to n which individually identifies each channel, there being n channels in total in the radiation $S_{in}$. The channels $C_i$ monotonically change in wavelength according to their respective channel number index i. The wavelength range of each channel $C_i$ with index i is from $(\lambda_i - \lambda_b)$ to $(\lambda_i + \lambda_b)$ where $\lambda_b$ is the wavelength bandwidth of each channel and $\lambda_i$ is a centre band radiation wavelength associated with each channel $C_i$. The radiation $S_{in}$ has a wavelength in the order of 1550 nm corresponding to a radiation frequency of approximately 194 THz. Each channel $C_i$ is capable of supporting information flow at a rate in the order of 10 Gbits/s.

Operation of the filter 10 will now be described with reference to FIG. 1. The input radiation $S_{in}$ propagates to the input port (1N) and further therefrom into the filter 10 whereat a radiation component corresponding to a channel $C_x$ is extracted from the radiation $S_{in}$ and output to the drop port (DROP). The radiation $S_{in}$ minus components corresponding to the channel $C_x$, namely modified radiation $S'_{in}$ propagates further into the filter 10 whereat a radiation component corresponding to a channel $C'_x$ input to the add port (ADD) is added to the radiation $S'_{in}$ to yield the radiation $S_{out}$ which is then output at the through port (THROUGH). Thus, the output radiation $S_{out}$ corresponds to the input radiation $S_{in}$ except that the component of radiation corresponding to the channel $C_x$ in the input radiation is replaced or substituted by a component of radiation corresponding to the channel $C'_x$ in the output radiation.

Figure 2:
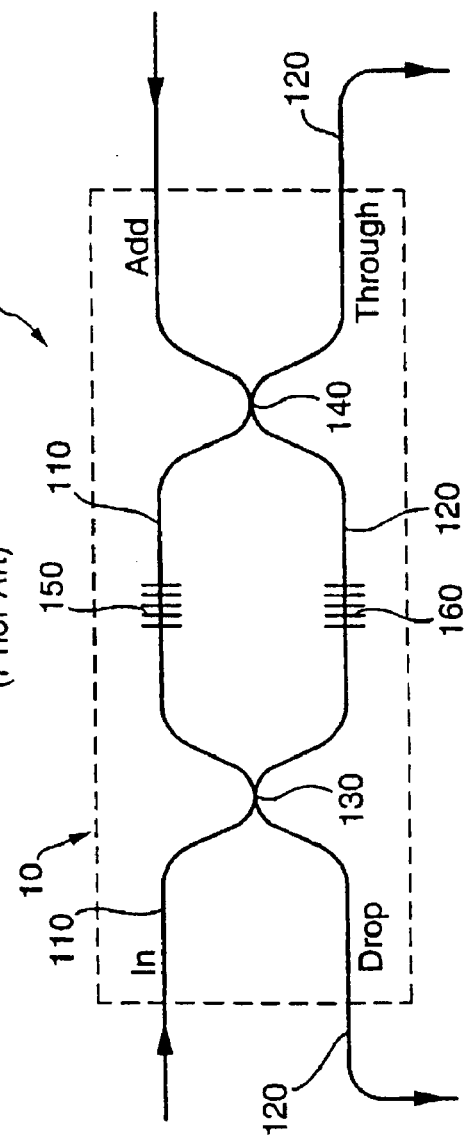
FIG. 2 is a schematic of a prior art passive add-drop filter.

A passive optical filter capable of providing a filtering function as described with respect to the filter 10 in FIG. 1 is illustrated in FIG. 2 and indicated by 100. The filter 100 comprises two monomode optical fibres 110, 120 mutually fusion bonded to provide two coupling regions 130, 140. In a region between the coupling regions, the core regions of the fibres 110, 120 are exposed to an ultraviolet radiation fringe image projected thereonto which locally modifies the refractive index of the core regions to define Bragg gratings 150, 160 respectively therein, the period of the grating arranged to match the wavelength of the radiation associated with the channels $C_x$, $C'_x$ when propagating through optical fibres of the type used for fabricating the gratings 150, 160.

Operation of the filter 100 will now be described with reference to FIG. 2. Input radiation propagating to the input port (IN) passes through the region 130 whereat it is coupled to both fibres 110, 120 and then propagates as mutually phase shifted radiation to the gratings 150, 160. The gratings 150, 160 reflect first radiation components corresponding to the channel $C_x$ and transmits radiation of other wavelengths. The first radiation components propagate back to the region 130 whereat they couple to the drop port (DROP) and pass along the fibre 120 to exit from the drop port. The radiation of other wavelengths propagates from the gratings 150, 160 to the region 140 through which it is transmitted to exit from the through port (TROUGH) along the fibre 10.

Radiation corresponding to the channel $C'_x$ propagates along the fibre 10 to the add port (ADD) and therefrom to the region 140 through which it is coupled and transmitted to the gratings 150, 160. The radiation is reflected at the gratings 150, 160 and returns to the region 140 at which it is coupled to the fibre 120 and continues to propagate along the fibre 120 to exit at the through port. The filter 100 exhibits an insertion loss of approximately 0.3 dB for radiation of wavelength in the range of the channels $C_i$ except for the channel $C_x$. Moreover, the filter 100 is operative to provide an isolation to cross-talk in the order of 25 dB from the add port to the drop port. This isolation is an important parameter when radiation output at the drop port is relatively weak relative to radiation applied at the add port.

The filter 100 is in the form of a Mach-Zehnder interferometer incorporating Bragg gratings in its two arms. The gratings 150, 160 incorporate ultraviolet radiation generated structures orientated orthogonally to an elongate axis of the fibres 110, 120 respectively and extending along the fibres 110, 120 a sufficient distance to provide a filtration characteristic appropriate for isolating the channel $C_x$, and hence also for adding the channel $C'_x$; this distance is in the order of 20 mm in practice and corresponds to 20 000 optical fringes. The gratings 150, 160 provide a more narrow-band filtration characteristic as their length increases.

Figure 3:
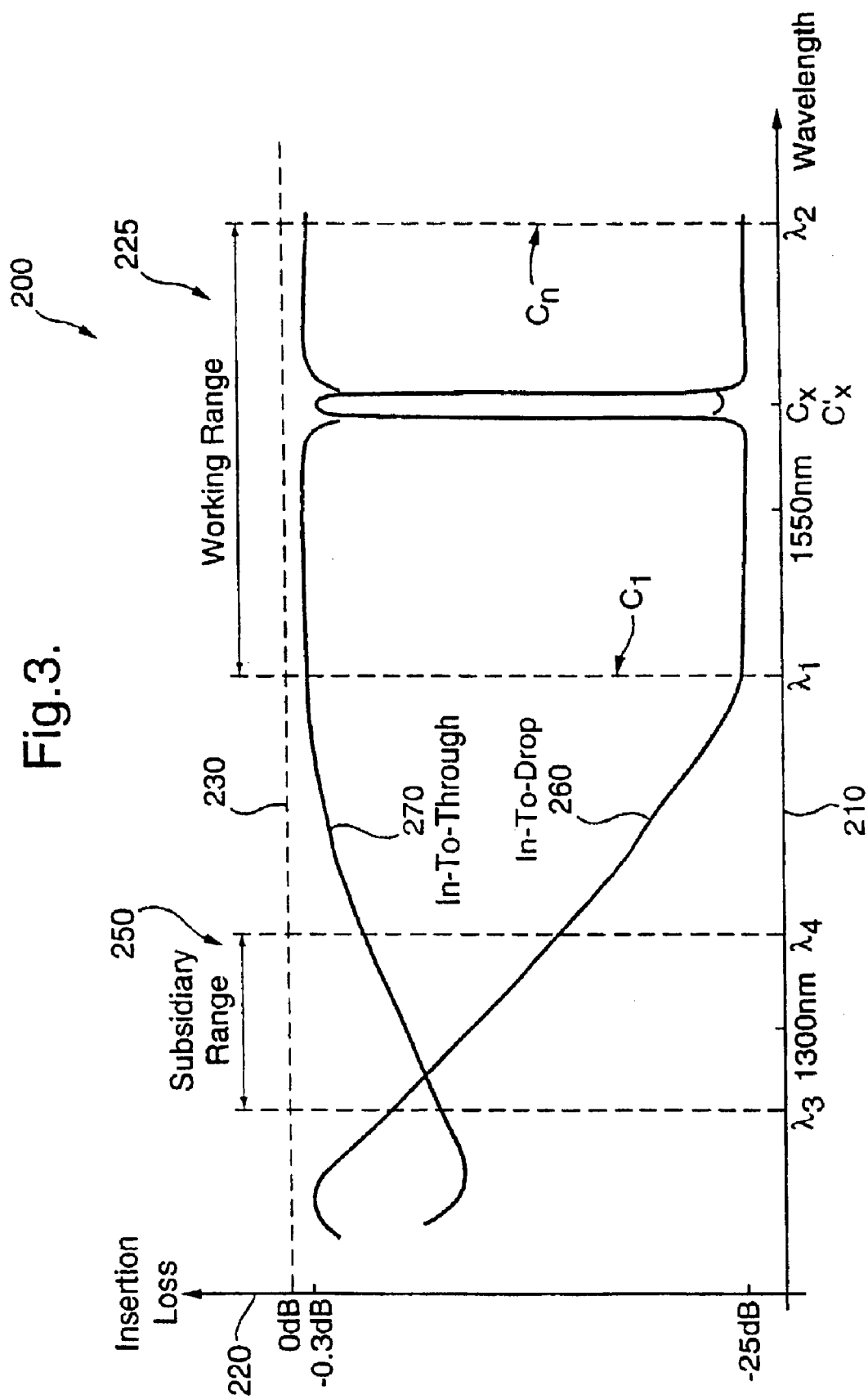
FIG. 3 is a graph of transmission characteristics of the filter shown in FIG. 2.

Referring now to FIG. 3, there is shown a graph of transmission characteristics of the filter 100. The graph is indicated by 200 and includes a horizontal axis 210 representing radiation wavelength and a vertical axis 220 representing insertion loss through the filter 100. The filter 100 is designed to operate over a working wavelength range from $\gamma_1$ to $\gamma_2$ indicated by 225 which includes radiation wavelengths corresponding to the channels $C_1$ to $C_n$. The working range 225 also comprises a wavelength of 1550 nm which corresponds to infra-red radiation; radiation at this wavelength is frequently employed in conventional telecommunications systems because relatively low optical fibre losses approaching 0.1 dB/km are achievable for radiation around this wavelength.

On the graph 200, there is shown a dashed line 230 corresponding to 0 dB filter insertion loss. Two curves 260, 270 included in the graph 200 correspond to insertion loss with regard to radiation transmission from the input port (IN) to the through port (TROUGH), and with regard to radiation transmission from the input port (IN) to the drop port (DROP) respectively.

In the working wavelength range 225, there is substantially 0.3 dB transmission loss from the input port to the through port except at a wavelength corresponding to the channel $C_1$ whereat the insertion loss approaches in the order of 30 dB. In contrast, transmission from the input port to the drop port as illustrated by the curve 260 is substantially in the order of −30 dB in the working range 225 except at a wavelength corresponding to the channel $C_x$ where transmission increases to a value in the order of −1 dB In a conventional communication system incorporating the passive filter 100, only radiation having wavelengths in the range of $\lambda_1$ to $\mu_2$ is employed for conveying information. Radiation outside the working range 225 is not used.

Figure 4:
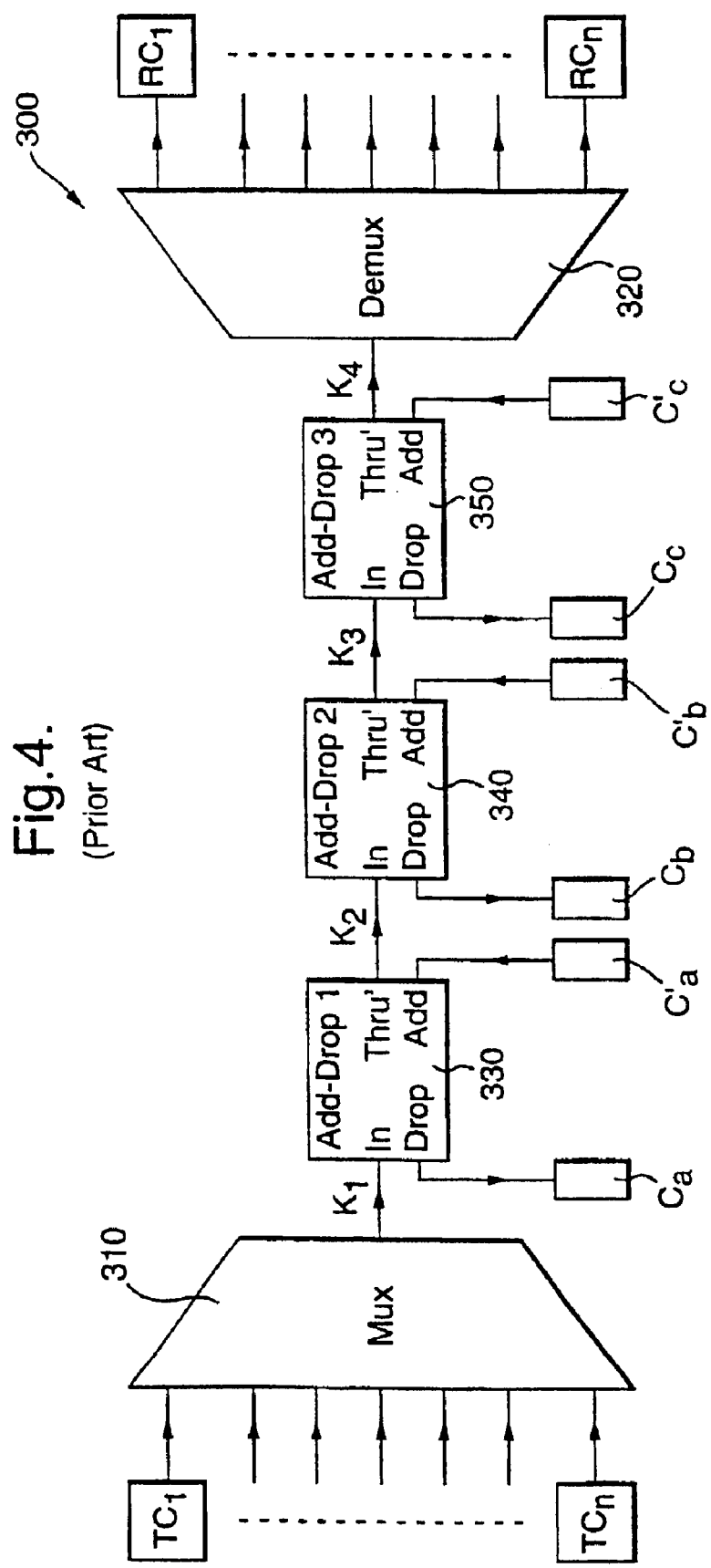
FIG. 4 is an illustration of a first communication system according to the prior art including a multiplexer unit, a demultiplexer unit and a number of add-drop filters inserted in a communication path connecting the transmitter unit to the receiver unit.

Referring now to FIG. 4, there is shown an illustration of a first communication system according to the prior art and indicated by 300. The first system 300 includes a multiplexer unit 310, a demultiplexer unit 320 and three add-drop filters 330, 340, 350 inserted in a communication path connecting the multiplexer unit 310 to the demultiplexer unit 320. Each add drop filter 330, 340, 350 is of an identical design to the filter 100. Moreover, the filters 330, 340, 350 have mutual different grating periods; as a consequence, the filters 330, 340, 350 (ADD-DROP 1, ADD-DROP 2, ADD-DROP 3) are operable to filter channels $C_a$, $C_b$, $C_c$ respectively where a, b, c subscripts are mutually different and are included in a range of 1 to n.

In the first system 300, the filter 330 is connected at its input port (In) to an output from the multiplexer unit 310.

The filter 330 is connected at its through port (Thru') to an input port (In) of the filter 340. Moreover, the filter 340 is connected at its through port (Thru') to an input port of the filter 350. Furthermore, the filter 350 is connected at its through port (Thru') to an input of the demultiplexer unit 320.

The transmitter unit 310 comprises a series of optical inputs TC, to TC, for receiving optical radiation corresponding to the channels $C_1$ to $C_n$ respectively. In a similar manner, the receiver unit 320 comprises a series of optical outputs $RC_1$ to $RC_n$ corresponding to the channels $C_1$ to $C_n$.

Operation of the system 300 will now be described. The multiplexer unit 310 multiplexes the inputs TC to corresponding wavebands in output optical radiation $K_1$. The radiation $K_1$ propagates from the unit 310 to the filter 330 which filters out a component of the radiation $K_1$ corresponding to the channel $C_x$ and outputs the component at its drop port. The filter 330 also adds radiation input to its add port to a portion of the radiation $K_1$ propagating through the filter 330 to generate output radiation $K_2$. The radiation $K_2$ propagates to the filter 340 whereat a component of radiation corresponding to the channel $C_b$ is isolated and output it at its drop port. In a similar manner to the filter 330, the filter 340 also adds radiation input to its add port to a portion of the radiation $K_2$ propagating through the filter 340 to generate output radiation $K_3$. The radiation $K_3$ propagates to the filter 350 whereat a component of radiation corresponding to the channel $C_c$ is isolated and output it at its drop port. The filter 350 also adds radiation input to its add port to a portion of the radiation $K_3$ propagating through the filter 350 to generate output radiation $K_4$. The output radiation $K_4$ propagates to the demultiplexer unit 320 whereat it is demultiplexed to generate output optical radiation at the outputs RC. The radiation at the outputs RC correspond to those at the inputs TC except for the radiation input at inputs $TC_a$, $TC_b$, $TC_c$, on account of the action of the filters 330, 340, 350. Additional components (not shown) are connected to the filters 330, 340, 350 for processing radiation isolated at the filters and for generating radiation to be input to the add ports of the filters 330, 340, 350.

In the system 300, the filters 330, 340, 350 can, for example, correspond to isolated subscribers or connection ports to other communication networks, for example metro-rings. Moreover, the inputs TC and the outputs RC can be connected together so that the system 300 itself becomes configured in the form of a ring communication system.

Although only three add-drop filters 330, 340, 350 are illustrated in FIG. 4, it is often desirable for the system 300 to incorporate more such filters, for example in the order of 50 filters to serve further subscribers. The number of passive add-drop filters that can practically be accommodated in the system 300 depends upon, for example, the insertion loss of each filter and a minimum level of radiation energy in the radiation $K_4$ which the demultiplexer unit 320 can accept whilst providing adequate signal/noise ratio thereat. There also arises a difficulty when the number of passive add-drop filters in the system 300 is increased that the degree of isolation between the add port and the drop port of each filter needs to be increased from that provided by the filter 100 otherwise problems arise with breakthrough of radiation from the add port to the drop port which interferes with radiation demodulation in components connected to the drop port A degree of isolation in excess of 25 dB is required when more filters are included; such a degree of isolation cannot be obtained from the filter 100 without modifying it.

Moreover, when numerous add-drop filters are incorporated into the system 300, there also arises a need to supervise signal processing functions in components associated with each of the filters as well as to provide a mechanism for diagnosing faults associated with the filters and their respective components. In order to achieve such supervision, the system 300 can be modified to allocate at least one of the channels $C_1$ to $C_n$ for filter supervision purposes. Such a modification has the disadvantage that the number of available channels for conveying information from the multiplexer unit 310 to the demultiplexer unit 320 is thereby reduced, especially when numerous additional add-drop filters are added to the system 300, each additional filter requiring its own associated supervision communication channel.

When supervisory information is required at the filters 330, 340, 350, one possible approach is to dispose filters similar to the filter 100 in pairs along the path of the system 300, one filter of each pair responsible for isolating supervisory information transmitted along the path and another filter of the pair for isolating radiation corresponding to a channel for output at the pair and handling radiation for adding at the pair. Such pairing associated with responding to supervisory information transmitted along the path involves incorporating more filters along the path which impacts upon signal/noise ratio at the demultiplexer unit 320 due to filter insertion losses. Thus, pairing as described above introduces a number of problems into the system 300 and represents a non-ideal solution.

The inventors have appreciated that coupling characteristics of the filter 100 outside the working range 225 can be usefully exploited for conveying supervisory information. Radiation having wavelengths falling within a subsidiary range indicated by 250 in FIG. 3 around 1330 nm has been found by the inventors to be especially beneficial for conveying additional supervisory information. Thus, the inventors have devised an optical add-drop filter which is especially suitable for passive networks where relatively low insertion loss is paramount. The devised add-drop filter is especially appropriate for smaller metro-ring communication systems incorporating in the order of 50 add-drop filters, the metro-ring having a diameter in the order of 30 to 40 km; such a metro-ring will be described in more detail later.

The devised filter provides the benefit that supervisory information can be transmitted, for example, within the system 300 without reducing the number of channels $C_i$ available for communicating communication traffic from the multiplexing unit 310 to the demultiplexer unit 320 and the filters 330, 340, 350. Moreover, the devised filter further provides the benefit that the number of filters in the path of the system 300 does not need to be increased for providing sup ry information for the filters 330, 340, 350, thereby potentially counteracting any increase in insertion loss associated with the filters 330, 340, 350.

In FIG. 3, the curve 270 shows that, in the subsidiary range 250, the transmission loss from the input port of the filter 100 to the through port is greater than in most of the working range 225; moreover, the curve 260 shows that the filter 100 is also capable of coupling substantial radiation from the input port to the drop port in this subsidiary range 250. On account of these characteristics, the inventors have appreciated that, although the filter 100 provides inferior characteristics at its subsidiary range 250 compared to its working range 225, the filter 100 can nevertheless be used to convey additional supervisory information in its subsidiary range 250 without affecting its performance in the working range 225. This will be described in more detail later.

The devised filter requires additional components to be added to the filters 330, 340, 350 to extract radiation within the subsidiary wavelength range 250 and demodulate it to provide supervisory information for controlling operation of the filters 330, 340, 350.

A metro-ring will now be considered. A metro-ring is a communication system employing two optical ring paths for conveying modulated radiation around the system. The two ring paths are arranged in parallel to increase communication reliability so that one of the ring paths is available in the event of the other ring path being broken or otherwise disabled.

Figure 5:
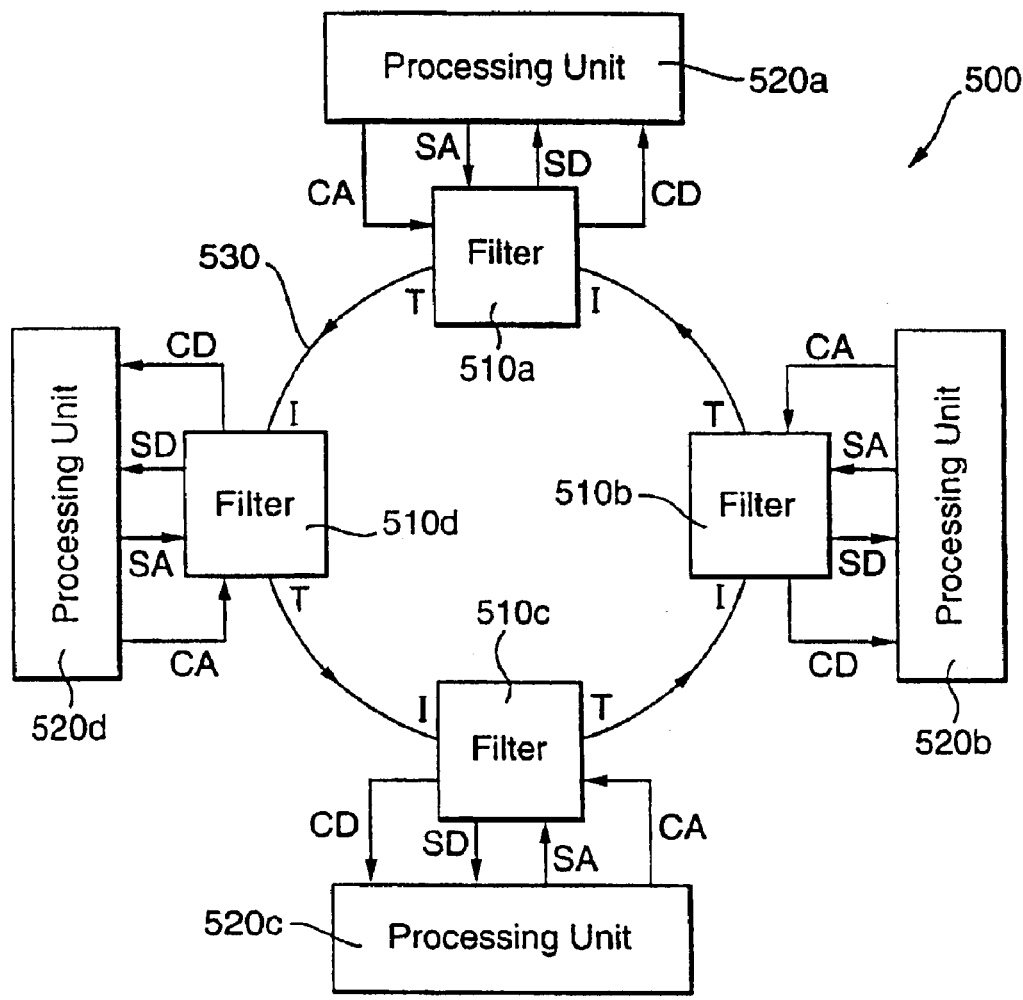
FIG. 5 is an illustration of a communication ring forming part of a metro-ring communication system.

Referring now to FIG. 5, there is shown an optical ring path of a metro-ring communication system; the ring path is indicated by 500 and includes four six-port add-drop filters 510a, 510b, 510c, 510d according to the invention. The filters 510 are of identical design except that their grating periods can be different to select particular radiation channels within the working range of wavelengths 225. Moreover, each filter 510 includes an input port (I), a through port (T), a channel drop port (CD), a supervisory drop port (SD), a supervisory add port (SA) and a channel add port (CA). Each filter 510a, 510b, 510c, 510 is connected to a respective processing unit 520a, 520b, 520c, 520d. The input ports of the filters 510a, 510b, 510c, 510d are connected to the through ports of the filters 510b, 510c, 510d, 510a respectively. Moreover, at each filter 510, the channel ports (CD, CA) and the supervisory ports (SD, SA) are connected to their associated processing unit 520. Furthermore, if necessary, the ring path 500 can incorporate more than four such filters 510, for example 50 such filters 510.

Each filter 510 is derived from the filter 100 but includes additional components for isolating supervisory information at its supervisory drop (SD) port and for adding supervisory information at its supervisory add (SA) port. Moreover, the additional components provide each filter 510 with enhanced cross-talk isolation between its supervisory ports and channel ports compared to the filter 100. However, in a similar manner to the filter 100, each filter 510 drops and adds a communication channel in the working wavelength range 225 as determined by its grating period, and accommodates radiation in the subsidiary range 250 for conveying supervisory information.

Operation of the ring 500 will now be described with reference to FIGS. 3 and 5. Radiation associated with channels $C_i$ and radiation conveying supervisory information propagates around an optical fibre waveguide path 530 forming the ring 500 in an anticlockwise direction as indicated by arrows on the path 530; radiation associated with the channels $C_i$ propagating around the path 530 is within the range 225 of working wavelengths $\lambda_1$ to $\lambda_2$, and radiation associated with conveying supervisory information is within the subsidiary range 250 of wavelengths $\lambda_3$ to $\lambda_4$ as shown in FIG. 3. Each filter 510 receives radiation supplied to it from a preceding filter 510 in the ring 500. Each filter 510 drops radiation associated with the supervisory information at its supervisory drop (SD) port, and radiation of wavelengths corresponding to its grating period at its channel drop (CD) port. Moreover, each filter 510 is capable of adding radiation at its channel add (CA) port for conveying channel information, and adding radiation at its supervisory add (SA) port for conveying supervisory information.

The filters 510 are arranged to have grating periods which correspond so that, for example, the filter 510a and its associated processing unit 520a are capable of communicating channel information to the filter 510c and its associated processing unit 520c. All the filters 510 and their associated processing units are capable of receiving and demodulating the supervisory information conveyed in the subsidiary range of wavelengths 250.

In the ring 500, supervisory information is circulated at considerably lower data rate compared to the channel $C_i$ information, for example each communication channel $C_i$ can have a data carrying capacity of 100 Mbit/s whereas the supervisory information is conveyed at a relatively lower data rate in a range of 100 kbits/s to 1 Mbit/s. This lower rate enables a relatively poorer signal-to-noise ratio to be tolerated for the supervisory information compared to the channel information because more low pass filtration can be applied in the processing units 520 to reduce noise when extracting the supervisory information. Because the filters 510 provide more insertion loss regarding supervisory information as a consequence of their less than ideal characteristics in the subsidiary range 250 compared to the working range of wavelengths 225, radiation energy regarding the supervisory information degrades more rapidly when propagating around the ring 500 compared to radiation within the working range of wavelengths 225.

The processing units 520 are operative amongst other tasks to process channel information dropped at their associated filter 510 channel drop (CD) ports and add corresponding channel information at their associated filter 510 channel add (CA) port; such processing can, for example, be simple amplification providing signal regeneration. Alternatively, the processing units 520 can perform processing on the channel information dropped at their associated channel drop (CD) ports to generate an output signal in response which is then modulated onto radiation which is subsequently applied to their channel add (CA) ports.

With regard to the supervisory information, the processing units 520 function in a manner akin to Ethernet; Ethernet is a trademark of Digital Corp., USA. Thus, the processing units 520 are normally in a "listening mode". One of the processing units 520 then outputs a supervisory command which is added as supervisory radiation in the subsidiary wavelength range 250 to the path 530 and is conveyed around the ring 500 to all the other processing units 520. If one or more of the processing units 520 recognises the command as being relevant to itself, it acts to execute the command; the command can, for example, relate to a manner in which the radiation dropped at the channel drop (CD) port associated with the one or more processing units 520 is processed therein to provide radiation at the channel add (CA) port associated with the units 520.

Other protocols associated with supervisory information conveyed around the ring 500 can be adopted if necessary, for example the processing unit 520a can be delegated as a management unit issuing supervisory commands to the units 520b. 520c, 520d and receiving responses therefrom conveyed by radiation in the subsidiary range 250.

The processing units 520 can interface to other circuits (not shown) connected thereto. Alternatively, one or more of the processing units 520 can provide an interface to other communication networks connected to the ring 500.

Figure 6:
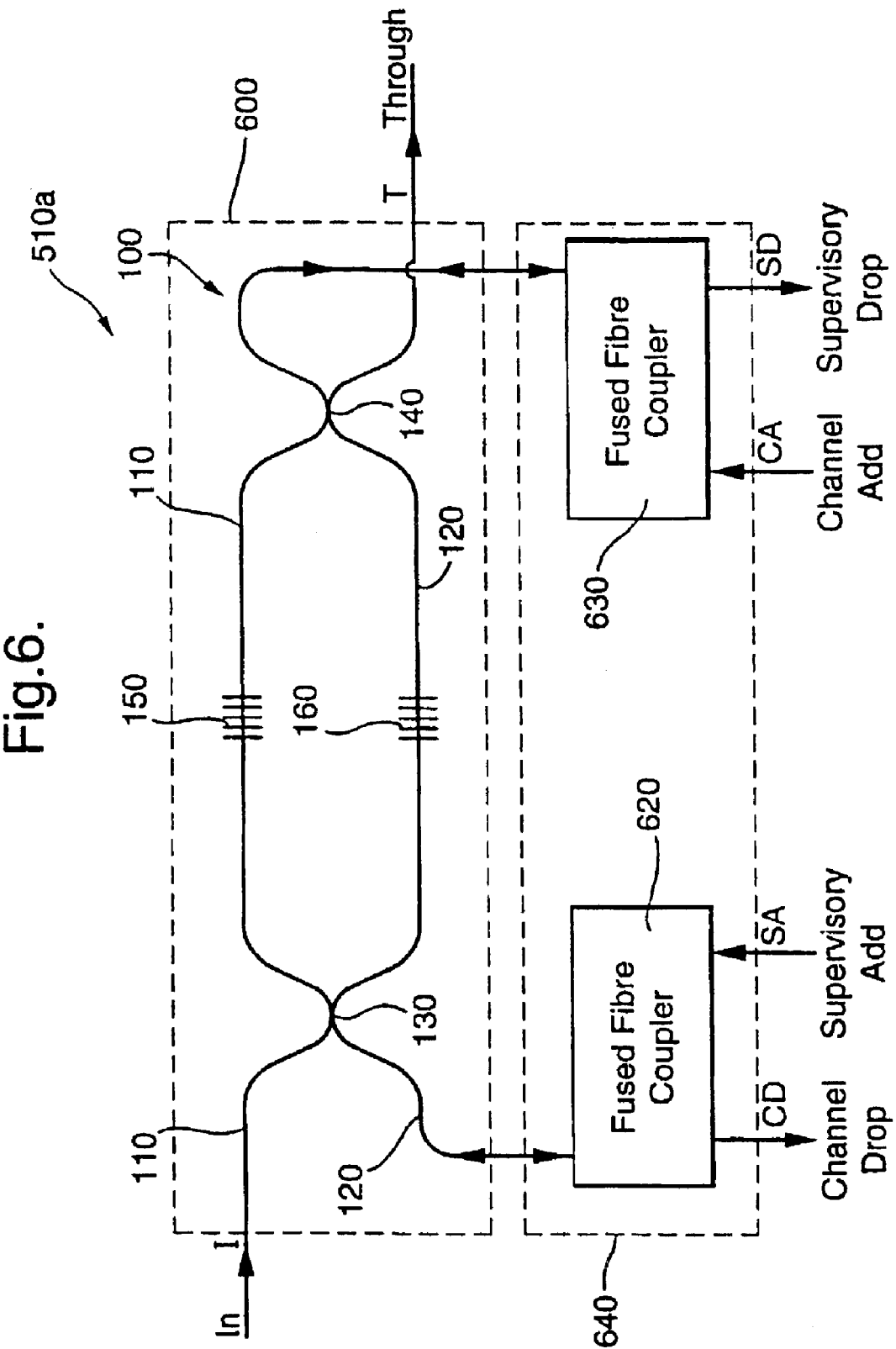
FIG. 6 is a schematic of a six-port add-drop filter according to the invention.

In order to further describe operation of the ring 500, the filters 510 will now be described with reference to FIG. 6. As aforesaid, the filters 510a, 510b, 510c, 510d are mutually identical except that their grating periods are selected to add and drop radiation channels specific to each of the filters 510. In FIG. 6, the filter 510a is shown and includes the optical filter indicated by 100 included within a dotted line 600. The filter 510a further comprises first and second fused fibre couplers 620, 630 respectively; these are shown included within a dotted line 640. The drop output port of the filter 100 is connected to an first input port of the first coupler 620. Moreover, the add port of the filter 100 is connected to first input port of the second coupler 630.

The optical filter 100 can be regarded as primary filtration whereas the fused fibre couplers can be regarded as secondary filtration.

The first coupler 620 incorporates a first output port CD at which channel drop radiation is output and a second input port SA at which supervisory add radiation is input. The second coupler 630 incorporates a first output port SD at which supervisory drop radiation is output and a second input port CA at which channel add radiation is input.

The fused couplers 620, 630 are proprietary components, for example a 1310/1550 nm WDM product type 40-20331-55-1 manufactured by Gould Fiber Optics Inc., which are wavelength selective to isolate radiation corresponding to working channels $C_i$ of communication traffic to the CD, CA ports and radiation corresponding to supervisory traffic to the SA, SD ports. The couplers 620, 630 are fabricated by mutually fusion bonding optical fibres together.

Operation of the filter 510a will now be described with reference to FIG. 6. The input (I) port receives input radiation which propagates along the fibre 10 to the coupling region 130. At the coupling region 130, the input radiation is split into first and second radiation beams which propagate along the fibres 110, 120 respectively from the coupling region 130 to the gratings 150, 160 whereat components of the beams having a wavelength corresponding to the gratings 150, 160 are reflected back to the coupling region 130 which couples them to the first input port of the coupler 620. As described with reference to the filter 100 in FIG. 2, the coupling region 130 imparts a mutual phase difference to the first and second radiation beams so that subsequent recombination of the radiation components at the coupling region 130 results in the components propagating selectively in a third beam to the fused coupler 620. In order to achieve this characteristic, careful control of relative distances of the gratings 150, 160 along the fibres 110, 120 respectively from the coupling region 130 is required during manufacture of the filter 510a. Moreover, the coupling regions 130, 140 must also provide a characteristic where they each split radiation received thereat equally for the working range 225. In the subsidiary range 250, the coupling regions 130, 140 do not exhibit equal splitting of radiation received thereat. In the subsidiary range 250, around 10% of radiation input at the input (I) port is coupled to the channel add (CA) port.

The coupler 620 is operable to output radiation corresponding to a working channel of communication traffic in the third beam at the channel drop (CD) port and receive supervisory radiation at the supervisory add (SA) port. A fraction of this supervisory radiation couples through the coupler 620 back to the coupling region 130 and continues therefrom through the gratings 150, 160 and the coupling region 140 to the through (T) port.

Components of the first and second beams which are not reflected at the gratings 150, 160 propagate through the gratings 150, 160 to the coupling region 140 whereat components of the input radiation corresponding to supervisory traffic are coupled as a fourth beam to the fused coupling region 140 whereat they coupled to and output from the supervisory drop (SD) port of the diffused coupler 630. Radiation input at the channel add (CA) port is coupled through the diffused coupler 630 to the coupling region 140 and therefrom to the through M port for output from the filter 510a.

The filter 510a provides the advantage that its insertion loss from its input (I) port to its though (T) port is similar to the filter 100 in FIG. 2 for communication channels which are not isolated for dropping and adding at the filter 510a, namely in the order of 0.3 dB, for example less than 1 dB. The filter 510a, and likewise the filters 510b, 510c, 510d, therefore provide the benefit of providing supervisory channel facilities without incurring additional insertion loss between the input (I) port and the through (T) port.

Figure 7:
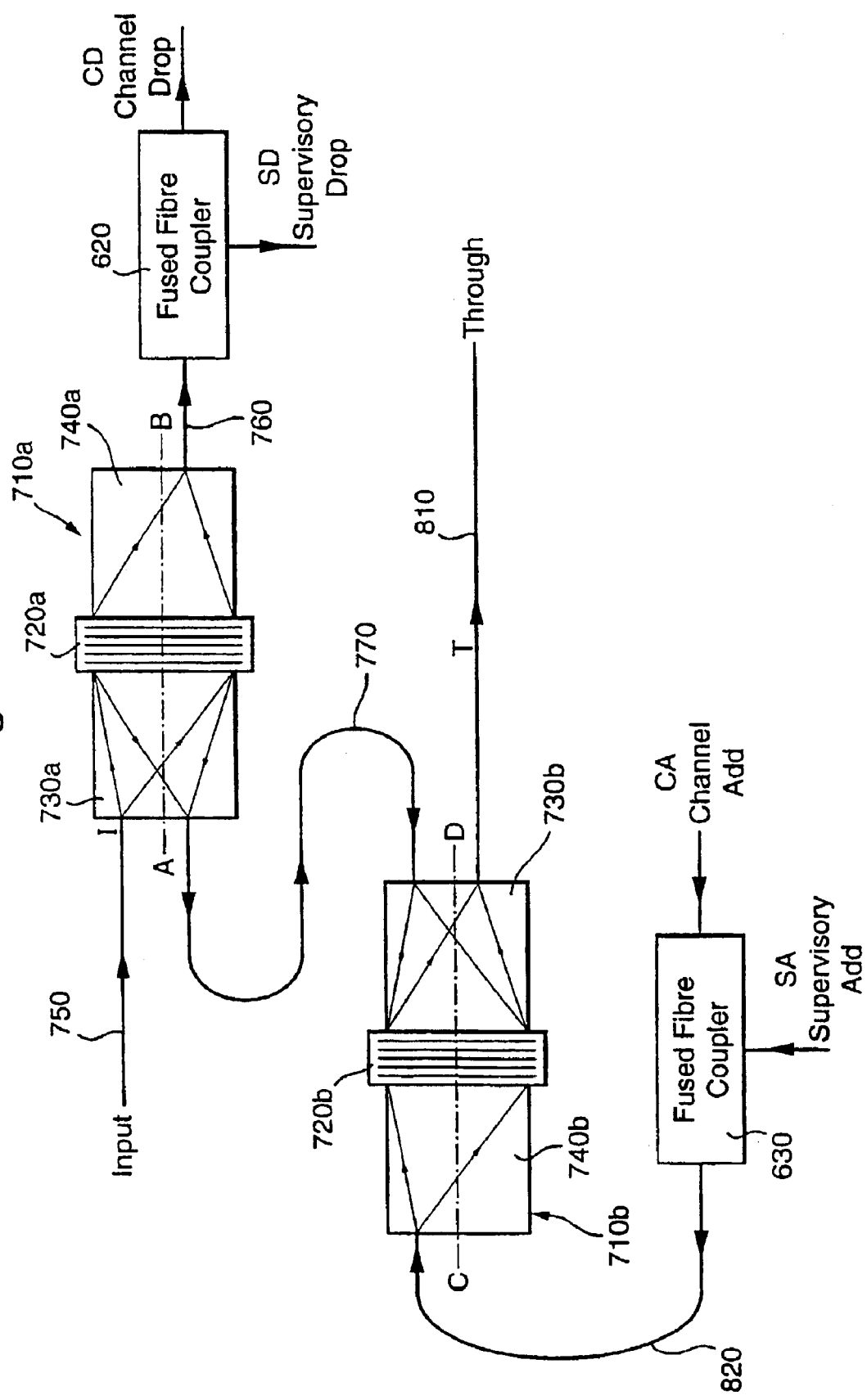
FIG. 7 is a schematic of a alternative six-port add-drop filter according to the invention.

An alternative filter which can be used in substitution for the filters 510 will now be described with reference to FIG. 7. In FIG. 7, there is shown a six-port add-drop filter indicated by 700. The filter 700 comprises the two fused fibre couplers 620, 630 together with two assemblies 710a, 710b connected in series from an input (I) port to an output through (T) port of the filter 700. The assemblies 710a, 710b incorporate dielectric filters 720a, 720b respectively. Moreover, the assemblies 710a, 710b also include input self-foc lenses 730a, 730b respectively and output self-foc lenses 740a, 740b respectively. The assemblies 710a, 710b are purchasable as proprietary modules from a company JDS Fitel Inc.

The input lenses 730a, 730b are each bonded at one of their ends onto first major faces of the filters 720a, 720b respectively. Likewise, the output lenses 740a. 740b are each bonded at one of their ends onto second major faces of the filters 720a, 720b respectively. For each of the filters 720, their major faces are mutually opposite and substantially parallel. Thus, the lenses 730, 740 are bonded onto mutually opposite faces of their respective filters 720. The lenses 730a, 740a are mutually aligned along a first central axis A-B. Likewise, the lenses 730b, 740b are mutually aligned along a second central axis C-D.

The filters 720a, 720b are identical and comprise a multilayer stack of dielectric layers, the layers having mutually different relative permittivities so as to form a plurality of Fabry-Perot etalons whose frequencies are arranged to match the wavelength of channel radiation to be dropped at the channel drop (CD) port.

The input (I) port is connected through a fibre 750 to the input lens 730a; the fibre 750 is joined to the lens 730a off-axis relative to the first axis A-B as shown. The channel drop (CD) port and supervisory drop (SD) port are connected through associated fibres to first and second output ports respectively of the coupler 620. An input port of the coupler 620 is connected through a fibre 760 to join off-axis relative to the first axis A-B onto the output lens 740a as shown. The input lens 730a is connected through an optical fibre 770 which is connected to the input lens 730b; the fibre 770 is joined at a first end thereof to the lens 730a off-axis relative to first axis A-B as shown, and also is joined at a second end thereof to the lens 730b off-axis relative to the second axis C-D as shown.

The supervisory add (SA) and channel add (CA) ports are connected to first and second input ports respectively of the coupler 630. An output port of the coupler 630 is connected through a fibre 820 to join off-axis relative to the second axis C-D onto the output lens 740b. Moreover, the through (T) port is connected through an optical fibre 810 to the input lens 730b; the fibre 810 is joined off-axis relative to the second axis C-D onto the input lens 730b.

The filter 700 provides the benefit that radiation transmitted directly from the input (I) port to the through (T) port undergo only two reflections at the filters 720a, 720b which results in a relatively low insertion loss in the order of 0.3 dB through a primary path of the filter 700. Separation of the supervisory radiation and channel drop/add occurs away from the primary path at secondary paths where maintaining a relatively low attenuation is not so critical.

Operation of the filter 700 will now be described with reference to FIG. 7. Input radiation propagating around the ring 500 is received at the input (I) port of the filter 700. The input radiation incorporates components corresponding to the communication channels $C_i$ in the working range of wavelengths 225 and supervisory information in the subsidiary range of wavelengths 250; these ranges are illustrated in FIG. 3. The input radiation passes along the fibre 750 to the input lens 730a whereat it propagates within the lens 730a to the dielectric filter 720a. The filter 720a transmits components of the radiation, namely first transmitted radiation, at wavelengths corresponding to a channel $C_x$ to be dropped at the filter 700 and supervisory radiation. The first radiation is focused by the lens 740a to a position off-axis where the fibre 760 is joined to the lens 740a. The first radiation proceeds to propagate along the fibre 760 to the coupler 620 which, on account of its wavelength selectivity, separates channel drop radiation from supervisory drop radiation and outputs them at the channel drop (CD) and supervisory (SD) ports respectively. Other components of radiation incident on the filter 720a, namely second reflected radiation, are reflected from the filter 720a to the input lens 730a. The second radiation is received off-axis by the fibre 770 along which it propagates to the input lens 730b. The second radiation propagates through the lens 730b to the dielectric filter 720b which transmits residual components of the radiation at a wavelength corresponding to a channel $C_x$ to be dropped at the filter 700 which come to a focus off-axis on the output lens 740b. Channel add (CA) and supervisory add (SA) radiation input at the channel add and supervisory add ports respectively are combined in the coupler 630 to provide third radiation which propagates along the fibre 820 to join off-axis onto the output lens 740b. The output lens 740b in combination with the filter 720b are operable to combine components of the second radiation reflected from the filter 720b with the third radiation to provide fourth radiation which propagates to the fibre 810 and is subsequently output at the through (T) port to propagate further around the ring 500.

The filter 700 provides the benefit that the channel drop (CD) port and the channel add (CA) port are mutually isolated through two dielectric filters 720a, 720b. This provides a high degree of isolation approaching 50 dB which is advantageous when the ring 500 incorporates numerous add-drop filters, for example 50 filters or more. Moreover, inclusion of the fused couplers 620, 630 in combination with the filters 720a, 720b ensures that channel radiation is effectively removed from radiation output at the supervisory drop (SD) port, thereby reducing cross-talk between the subsidiary wavelength range 250 and the working wavelength range 225.

Figure 8:
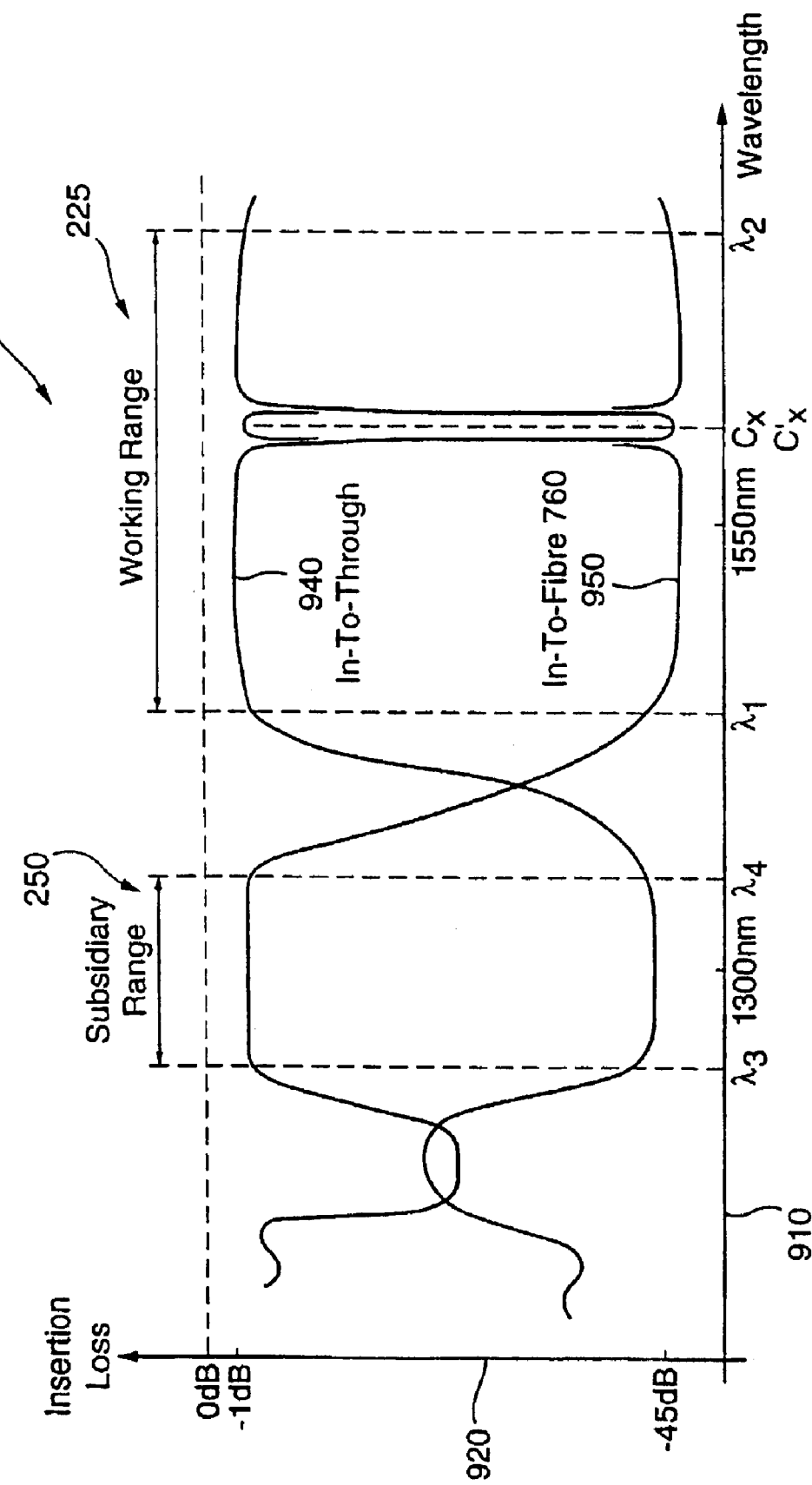
FIG. 8 is a graph of radiation transmission characteristics of the alternative filter shown in FIG. 7.

Radiation transmission characteristics of the filter 700 will now be described with reference to FIG. 8 which comprises a graph indicated by 900. The graph 900 includes a wavelength axis 910 and an insertion loss axis 920 orthogonal to the wavelength axis 910.

Moreover, the graph 900 illustrates the range 250 spanning from a wavelength $\lambda_3$ to a wavelength $\lambda_4$. Furthermore, the graph 900 illustrates the working range of wavelengths 225 spanning from a wavelength $\lambda_1$ to a wavelength $\lambda_2$ which includes radiation of the communication channels $C_i$, for example the channel $C_x$ which the filler 700 is designed to isolate.

A curve 940 represents insertion loss from the input (I) port to the through (T) port. The curve 940 shows that the filter 700 is effective at isolating the supervisory information radiation at the supervisory drop (SD) port, and that the filter 700 is also effective to transmit radiation within the working range 225 except at a wavelength corresponding to the channel $C_x$ which the filter 700 is designed to drop at the channel drop (CD) port. A curve 950 represents insertion loss from the input (I) port to the fibre 760. In the subsidiary range of wavelengths 250, the filter 720b provides effective isolation such that the insertion loss within the range 250 is relatively low in the order of 0.5 dB and there is relatively low crosstalk, namely in the order of 45 dB, from radiation in the working range 225.

Figure 9:
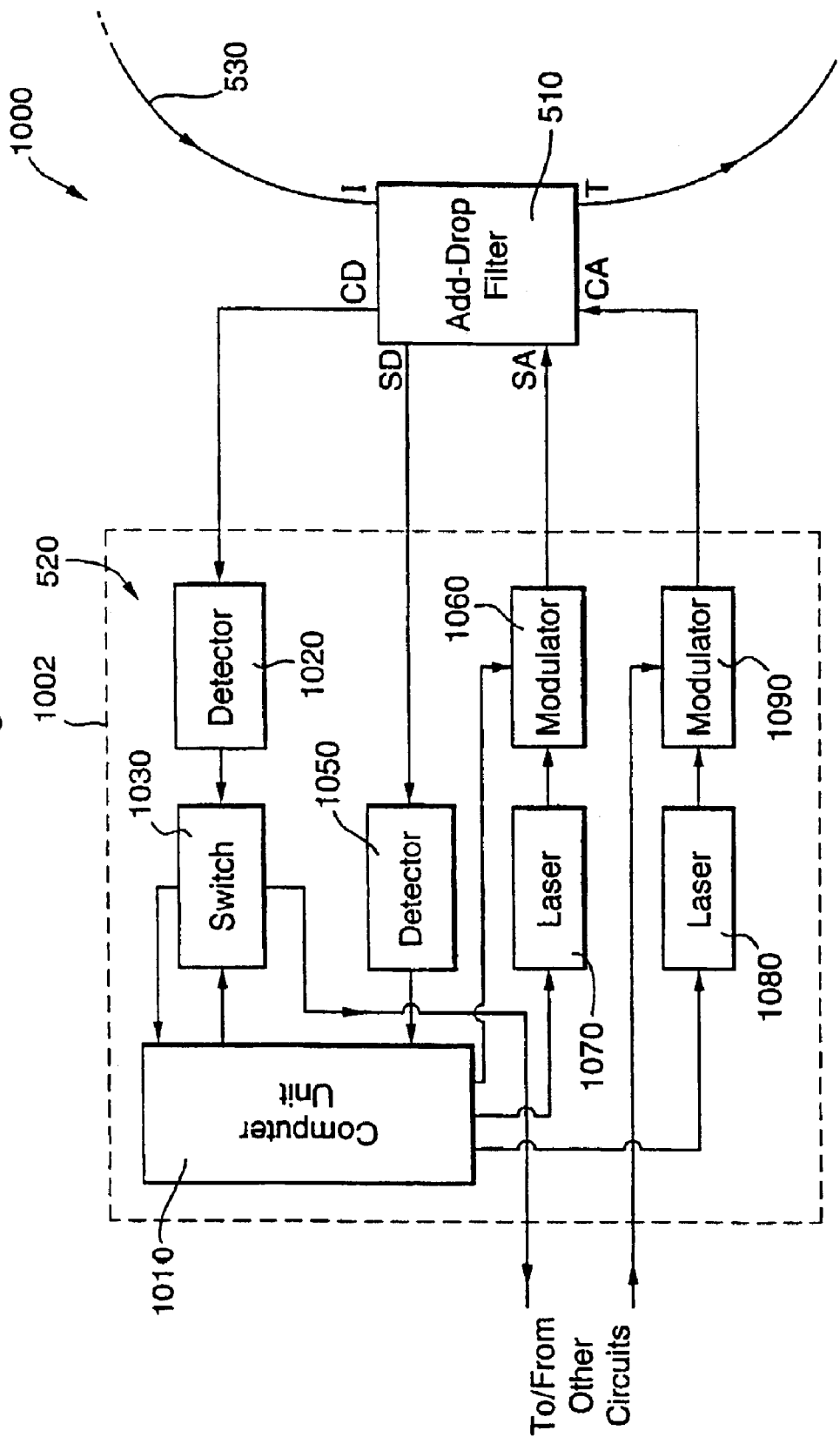
FIG. 9 is a schematic of a processing unit incorporated into the communication ring illustrated in FIG. 5.

The ring 500 shown in FIG. 5 can potentially incorporate a variety of possible processing units having various internal architectures. However, in order to further describe the ring 500 as shown in FIG. 5, an example of a suitable architecture for the processing units 520 will now be described with reference to FIG. 9. In FIG. 9, an add-drop filter 510 and its associated processing unit 520 are indicated by 1000. The processing unit 520 is shown included within a dotted line 1002.

The processing unit 520 comprises a computer unit 1010 and a first detector 1020 whose optical input is connected to the channel drop (CD) port of the filter 510 and whose electrical output is connected to a first input of a switch 1030. The switch 1030 also comprises a second input which is connected to a first output of the computer unit 1010, a first output which is connected to a first input of the computer unit 1010 and a second output which is connected to other circuits (not shown) connected to the processing unit 520. The processing unit 520 further comprises a second detector 1050 whose optical input is connected to the supervisory drop (SD) Port of the filter 510 and whose optical output is connected to a second input of the computer unit 1010. The processing unit 520 additionally includes a first optical modulator 1060 whose output is connected to the supervisory add (SA) port of the filter 510 and whose optical input is connected to an output of a first laser 1070. The computer unit 1010 incorporates a third output which is connected to a modulation input of the first modulator 1060 and a fourth output which is connected to a control input of the first laser 1070. The processing unit 520 also includes a second laser 1080 whose electrical control input is connected to a fifth output of the computer unit 1010, and whose optical output is connected to an optical input of a second optical modulator 1090. The second modulator 1090 also incorporates an electrical modulating input and an optical output which is connected to the channel add (CA) port of the filter 510.

Operation of the processing unit 520 will now be described with reference to FIG. 9. Radiation is received at the input (I) port of the filter 510. Components of the radiation within the subsidiary range 250 are directed by the filter 510 to the supervisory drop (SD) port and continue by propagating onto the detector 1050 whereat they are demodulated and electrically filtered to provide supervisory data which the computer unit 1010 receives at its second input. The computer unit 1010 interprets the supervisory data and determines whether or not the data is relevant to the unit 520. If the data is relevant, the computer unit 1010 responds either by configuring the switch 1030 as directed by the data or emitting response data at its third and fourth outputs which modulate radiation lying within the subsidiary range 250 generated by the first laser 1070 which subsequently propagates from the first modulator 1060 to the supervisory add (SA) port of the filter 510. The computer unit 1010 is thereby capable of regenerating the supervisory information for further transmission around the ring 500, or corresponding to the supervisory information by emitting radiation in the subsidiary range 250 back to the ring 500, or configuring the processing unit 520 in response to the supervisory information. Radiation components in the working range 225 are output at the channel drop (CD) port and pass to the first detector 1020 whereat they are demodulated to provide a corresponding electrical signal which is output from the detector 1020 to the switch 1030 for directing thereat to the computer unit 1010 at its first input or directing to the other circuits (not shown) connected to the processing unit 520. The processing unit 520 is additionally operative to receive electrical signals from the other circuits which the second modulator 1090 modulates onto radiation within the working range 225 generated by the second laser 1080 to provide output radiation. The output radiation propagates to the channel add (CA) port of the filter 510 whereat it is subsequently output as radiation at the through (T) port of the filter 510.

It will be appreciated that modifications can be made to the processing unit 520 without departing from the scope of the invention. For example, the processing unit 520 preferably also includes optical amplifiers operating under control of the computer unit 1010 for optically regenerating the supervisory information provided optically at the supervisory drop (SD) port and injecting a regenerated version thereof at the supervisory add (SA) port, and for optically regenerating radiation components corresponding to the channel $C_x$ output at the channel drop (CD) port and providing a regenerated version thereof at the channel add (CA) port for further propagation around the ring 500. Because the subsidiary range 250 is of a different wavelength to the working range 225 of wavelengths, it is desirable that separate amplifiers should be employed to amplify over these ranges to provide regeneration rather than employing a single amplifier to amplify over both ranges simultaneously.

Referring again to FIG. 5, when numerous additional filters 510 and processing unit 520 am included in the ring 500, insertion loss of the filters 510 can result in excessive attenuation, for example each filter 510 results in an insertion loss of approximately 0.5 dB which, for 100 filters 510 in the ring 500, would result in a radiation attenuation of 50 dB around the ring 500 which is sometimes unacceptable. In order to ameliorate the effect of this attenuation, optical regeneration amplifiers can be included at one or more locations in the path 530 of the ring 500.

Figure 10:
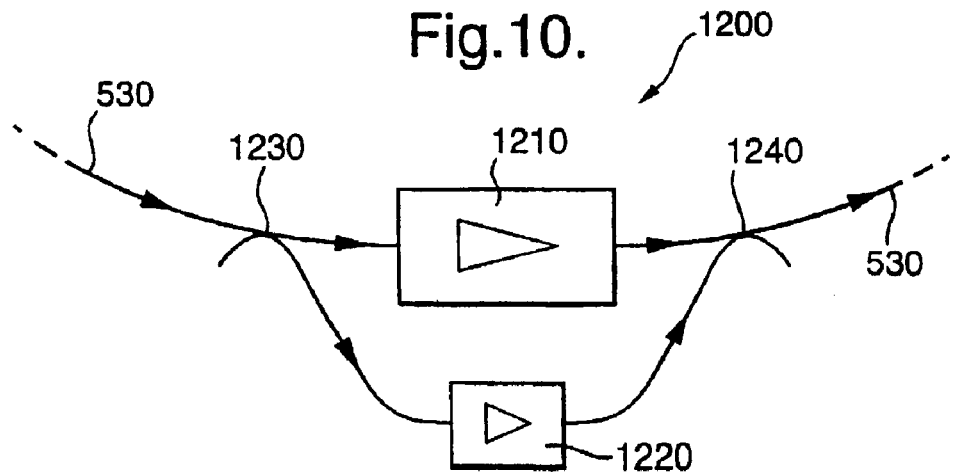
FIG. 10 is an illustration of a configuration of two optical amplifiers suitable for incorporation into the ring shown in FIG. 5 for providing optical regeneration of radiation propagating therearound.

FIG. 10 is an illustration of an amplifier unit indicated by 1200 comprising two optical amplifiers, the unit 1200 being suitable for incorporation into the path 530 for providing optical regeneration of radiation propagating therearound. The amplifier unit 1200 comprises a first optical amplifier 1210 operable to amplify radiation input thereat over the working range of wavelengths 225 and a second optical amplifier 1220 operative to amplify radiation input thereat over the subsidiary range 250 of wavelengths. The unit 1200 further comprises an input coupler 1230 and an output coupler 1240 formed by fusion bonding optical fibre waveguides.

Operation of the amplifier unit 1200 will now be described with reference to FIG. 10. Input radiation comprising components at both the working range 225 of wavelengths and at the subsidiary range 250 propagates along the path 530 to the coupler 1230 which splits the radiation along two paths to the first amplifier 1220 and to the second amplifier 1220. The first amplifier 1210 amplifies components of the radiation within the working range 225 and outputs an amplified version thereof to the coupler 1240. Likewise, the second amplifier 1220 amplifies components of the radiation within the subsidiary range 250 and outputs an amplified version thereof to the coupler 1240. The coupler 1240 combines amplified radiation received from the amplifiers 1210, 1220 to provide combined amplified radiation which propagates further around the path 530.

The amplifier unit 1200 provides the advantage that the amplifiers 1210, 1220 can be optimised to amplify at specific ranges of radiation wavelengths. It is technically difficult to provide amplification at both the working range 225 and at the subsidiary range 250 using a single optical amplifier, especially if a relatively high gain is required. If necessary, the ring 500 can incorporate one or more amplifier units, for example amplifier units distributed in different parts of the ring 500 to boost radiation strength at several locations.

It will be appreciated by those skilled in the art that modifications can be made to the add-drop filters 510a to 510d, 700 in a communication system to provide additional communication wavebands usable for conveying information for supervisory purposes within the system as described above without departing from the scope of the invention. Rather than the system being ring based, as in the case of the ring 500, the communication system operating according to the method can be a combination of ring and linear paths, or alternatively be a configuration of branched linear paths. Moreover, alternative designs of passive add-drop filter to those shown in FIGS. 6 and 7 can be employed provided that they perform in a similar manner to the add-drop filters 510a, 650, 700. Furthermore, one or more of supervisory drop (SD), channel drop (CD), supervisory add (SA) and channel add (CA) optical ports can be omitted if necessary.

What is claimed is:

1. An add-drop filter for filtering wavelength division multiplex information bearing radiation, said information bearing radiation comprising a plurality of communication channel radiation components, each component being associated with a respective communication channel and having a wavelength within a first range of radiation wavelengths and at least one supervisory radiation component associated with supervisory traffic and having a wavelength within a second different range of radiation wavelengths, the filter comprising:

a) a main input for receiving the input information bearing radiation at the filter;

b) a main output for outputting output information bearing radiation from the filter;

c) at least one subsidiary input and at least one subsidiary output;

d) primary filtering means through which the main input is coupled to the main output;

e) secondary filtering means through which the primary filtering means is coupled to said at least one subsidiary input and subsidiary output;

f) the primary filtering means being operative for extracting at least one preferred channel radiation component and said at least one supervisory radiation component from the input information bearing radiation and coupling said at least one preferred component and said at least one supervisory component to the secondary filtering means, and for receiving from the secondary filtering means combined radiation comprising at least one substitute channel radiation component corresponding to said at least one preferred radiation component and at least one substitute supervisory radiation component corresponding to said at least one supervisory radiation component and outputting the combined radiation together with the input information bearing radiation transmitted through the primary filtering means from the main input at the main output; and g) the secondary filtering means being operative for isolating from the radiation coupled to the secondary filtering means from the primary filtering means said at least one preferred and supervisory radiation components and coupling the latter to corresponding subsidiary outputs, and combining the substitute radiation components received at the secondary filtering means to generate the combined radiation.

2. The filter according to claim 1, wherein the primary filtering means comprises an interferometric structure comprising Bragg gratings for extracting said at least one preferred channel and said at least one supervisory radiation components from the input information bearing radiation and coupling said at least one preferred and said at least one supervisory components to the secondary filtering means.

3. The filter according to claim 1, wherein the primary filtering means comprises a multilayer optical etalon interference structure for extracting said at least one preferred channel and said at least one supervisory radiation components from the input information bearing radiation and coupling said at least one preferred channel and said at least one supervisory radiation components to the secondary filtering means.

4. The filter according to claim 1, wherein the secondary filtering means includes a fused fiber coupler for isolating from the radiation provided from the primary filtering means said at least one preferred channel and said at least one supervisory radiation components.

5. The filter according to claim 1, wherein the secondary filtering means includes a fused fiber coupler for combining radiation of said at least one substitute radiation component and said at least one substitute supervisory component to provide the combined radiation for coupling to the primary filtering means.

6. The filter according to claim 1, wherein, in operation, the primary filtering means provides an optical attenuation therethrough from the main input to the main output of less than 1 dB for radiation components having wavelengths corresponding to the communication channels present in the input information bearing radiation.

7. The filter according to claim 1, wherein the first range of wavelengths have a free-space wavelength of substantially 1550 nm, and wherein the second range of wavelengths have a free-space wavelength of substantially 1300 nm.

8. A wavelength division multiplex communication system comprising: a plurality of nodes; and at least one filter for adding and dropping radiation components thereat from information bearing radiation propagating within the system between the nodes, said information bearing radiation comprising a plurality of radiation components, each component being associated with a respective communications channel and having a wavelength within a first range of radiation wavelengths and at least one supervisory radiation component associated with a supervisory channel and having a wavelength within a second different range of radiation wavelengths, said at least one filter including:

a) a main input for receiving input information bearing radiation at the filter;

b) a main output for outputting output information bearing radiation from the filter;

c) at least one subsidiary input and at least one subsidiary output;

d) primary filtering means through which the main input is coupled to the main output;

e) secondary filtering means through which the primary filtering means is coupled to said at least one subsidiary input and subsidiary output;

f) the primary filtering means being operative for extracting at least one preferred channel radiation component and said at least one supervisory radiation component from the input information bearing radiation and coupling said at least one preferred component and said at least one supervisory component to the secondary filtering means, and for receiving from the secondary filtering means combined radiation comprising at least one substitute channel radiation component corresponding to said at least one preferred radiation component and a substitute supervisory radiation component corresponding to said at least one supervisory radiation component and outputting the combined radiation together with the input information bearing radiation transmitted through the primary filtering means from the main input at the main output; and g) the secondary filtering means being operative for isolating from the radiation coupled to the secondary filtering means from the primary filtering means said at least one preferred and supervisory radiation components and coupling the latter to corresponding subsidiary outputs, and combining the substitute radiation components received at the secondary filtering means to generate the combined radiation.

9. The system according to claim 8, wherein at least one of the nodes is operable to regenerate by amplification of at least one radiation component corresponding to one of supervisory traffic and communication traffic.

10. The system according to claim 9, wherein a first amplifier is used for amplifying radiation components corresponding to the supervisory traffic, and wherein a second amplifier is used for amplifying radiation components corresponding to the communication traffic.

11. The system according to claim 9, wherein the nodes are arranged in a metro-ring configuration, and wherein said at least one filter is operable to couple ring communication traffic radiation through the primary filtering means from the main input to the main output.

12. The system according to claim 9, wherein at least one of the nodes in the system incorporates computing means for interpreting the supervisory traffic received at said at least one node and for controlling nodal response thereto.

13. The system according to claim 12, wherein the computing means of said at least one node in the system is operable to be normally in a listening state receptive to the supervisory traffic, and switchable to a responsive state in response to receiving the supervisory traffic from another node addressed by the computing means.

14. The system according to claim 8, wherein the first range of wavelengths have a free-space wavelength of substantially 1550 nm, and wherein the second range of wavelengths have a free-space wavelength of substantially 1300 nm.

15. A method of extracting supervisory traffic and preferred communication traffic from information bearing radiation propagating within a wavelength division multiplex communication system including at least one add-drop filter, said information bearing radiation comprising a plurality of radiation components, each component being associated with a respective communications channel and having a wavelength within a first range of radiation wavelengths and at least one supervisory radiation component associated with supervisory traffic and having a wavelength within a second different range of radiation wavelengths, the method comprising the steps of:

a) receiving the information bearing radiation at the at least one filter;

b) passing the information bearing radiation to primary filtering means of the at least one filter for extracting filtered radiation from the information bearing radiation corresponding to the preferred communication traffic and the supervisory traffic, and outputting the information bearing radiation after extraction therefrom of the filtered radiation back to the communication system; and c) receiving the filtered radiation at secondary filtering means of the at least one filter for isolating the preferred communication traffic from the supervisory traffic and outputting these to respective subsidiary outputs.

16. The method according to claim 15, wherein the first range of wavelengths have a free-space wavelength of substantially 1550 nm, and wherein the second range of wavelengths have a free-space wavelength of substantially 1300 nm.

* * * * *

UNITED STATES PATENT AND TRADEMARK OFFICE
CERTIFICATE OF CORRECTION

PATENT NO.         : 6,873,758 B2
APPLICATION NO. : 10/111653
DATED                  : March 29, 2005
INVENTOR(S)        : Carter et al.

It is certified that error appears in the above-identified patent and that said Letters Patent is hereby corrected as shown below:

In Column 5, Line 66, delete "(TROUGH)," and insert -- (THROUGH), --, therefor.

In Column 6, Line 22, delete "(1N)" and insert -- (IN) --, therefor.

In Column 6, Line 61, delete "(TROUGH)" and insert -- (THROUGH) --, therefor.

In Column 6, Line 61, delete "10." and insert -- 110. --, therefor.

In Column 6, Line 63, delete "10" and insert -- 110 --, therefor.

In Column 7, Line 37, delete "(TROUGH)," and insert -- (THROUGH), --, therefor.

In Column 7, Line 43, delete "$C_1$" and insert -- $C_x$ --, therefor.

In Column 7, Line 51, delete "$\mu_2$" and insert -- $\lambda_2$ --, therefor.

In Column 8, Line 8, delete "TC, to TC," and insert -- $TC_1$ to $TC_n$ --, therefor.

In Column 8, Line 17, delete "$C_x$" and insert -- $C_a$ --, therefor.

In Column 9, Line 49, delete "sup ry" and insert -- supervisory --, therefor.

In Column 10, Line 21, delete "510" and insert -- $510d$ --, therefor.

In Column 12, Line 22, delete "10" and insert -- 110 --, therefor.

In Column 12, Line 63, delete "M" and insert -- (T) --, therefor.

In Column 14, Line 60, delete "filler" and insert -- filter --, therefor.

UNITED STATES PATENT AND TRADEMARK OFFICE
CERTIFICATE OF CORRECTION

PATENT NO.         : 6,873,758 B2
APPLICATION NO. : 10/111653
DATED                 : March 29, 2005
INVENTOR(S)       : Carter et al.

It is certified that error appears in the above-identified patent and that said Letters Patent is hereby corrected as shown below:

In Column 15, Line 7, delete "45 dB," and insert -- -45 dB, --, therefor.

In Column 16, Line 35, delete "am" and insert -- are --, therefor.

Signed and Sealed this

Tenth Day of March, 2009

JOHN DOLL
*Acting Director of the United States Patent and Trademark Office*